(12) United States Patent
Schaeche et al.

(10) Patent No.: US 7,275,504 B2
(45) Date of Patent: Oct. 2, 2007

(54) WATER HEATER

(76) Inventors: Gavin Schaeche, 463-467 Warrigal Road, Moorabbin, Victoria 3189 (AU); David Lowe, 463-467 Warrigal Road, Moorabbin, Victoria 3189 (AU); Richard Rees, 463-467 Warrigal Road, Moorabbin, Victoria 3189 (AU)

(*) Notice: Subject to any disclaimer, the term of this patent is extended or adjusted under 35 U.S.C. 154(b) by 0 days.

(21) Appl. No.: 11/443,392

(22) Filed: May 30, 2006

(65) Prior Publication Data
US 2006/0288964 A1    Dec. 28, 2006

(30) Foreign Application Priority Data
Jun. 3, 2005  (AU)  .............................. 2005100473

(51) Int. Cl.
    *F24H 9/14*    (2006.01)
(52) U.S. Cl. ...................... 122/13.3; 122/15.1
(58) Field of Classification Search ............. 122/13.01, 122/4 A, 13.3, 15.1, 18.1, 18.31; 392/441
    See application file for complete search history.

(56) References Cited

U.S. PATENT DOCUMENTS

| | | | |
|---|---|---|---|
| 2,429,916 A * | 10/1947 | Belgau | ...................... 122/14.21 |
| 3,503,384 A | 3/1970 | Matarazzo et al. | ......... 126/362 |
| 6,334,411 B1 * | 1/2002 | Lesage et al. | ............. 122/18.1 |

* cited by examiner

*Primary Examiner*—Gregory Wilson
(74) *Attorney, Agent, or Firm*—Hodes, Pessin, & Katz, P.A.

(57) ABSTRACT

The water includes a tank 10 which includes dual cold water inlets 21a, 21b. One or other of the cold water inlets 21a, 21b is in use connected to a cold water supply line. The cold water inlets 21a, 21b extend through inlet pipes 21c, 21d within the tank 10 and join at a cold water junction 22. Extending upwardly for cold water is a tempering tube or pipe 31, 31a, 31b that extends within the tank to the upper region of the tank 10 where the cold water can mix with hot water being drawn from the tank and passing through one of a pair of hot water outlets 26a, 26b. Either of the water outlets 26a, 26b in use is connected to a hot water delivery line for supply of the tempered water.

9 Claims, 6 Drawing Sheets

WATER HEATER

FIELD OF INVENTION

This invention relates to water heaters. More particularly, this invention relates to heaters for providing tempered hot water at a temperature lower than the temperature at which the water is stored.

BACKGROUND TO THE INVENTION

Hot water heaters comprising tanks for storage of heated water have been described with means for tempering outgoing hot water drawn from the tank with cold water to achieve the delivery of tempered hot water at the tap for the purposes of safety and efficiency. Safety regulations may require hot water delivered at domestic tap outlets to be about 50° C. to avoid accidents associated with scalding, particularly of the aged and infants. However, because the storage of hot water can be more efficiently achieved by heating a smaller volume of stored hot water to a hotter temperature, e.g. 65° C., mechanisms for tempering the hot water drawn from the storage tank prior to delivery to a domestic tap have been proposed. One such arrangement is described in the Applicant's Australian patent No. 654107 where a hot water heater and vessel is provided with a conduit for directing cold water from the cold water inlet to the hot water outlet to reduce the temperature of the hot water delivered from the vessel to a tap outlet. Whilst this arrangement may work satisfactorily, such water heaters can present difficulties due to their bulky and asymmetrical nature and may be difficult to install in confined or congested spaces required in some domestic and commercial water heater installations, such as in town houses, units, apartments and small office kitchens. Moreover, the increased number of joins associated with fittings of the aforementioned prior art provide the potential for damaging or disruptive leakages where the fittings fail e.g. due to incorrect installation, corrosion, impact damage.

The above references to and descriptions of prior proposals or products are not intended to be, and are not to be construed as, statements or admissions of common general knowledge in the art.

It is an object of the present invention to ameliorate one or more of the aforementioned disadvantages of the prior art or to at least provide a useful alternative thereto.

SUMMARY OF INVENTION

In one aspect of the invention, there is provided a water heater for delivering heated water and having a water storage vessel in which heated water is stored and from which water is drawn, the heater having:
- (a) a cold water inlet for admitting water to be heated to the vessel;
- (b) a hot water outlet through which heated water is delivered;
- (c) a cold water flow path from the cold water inlet to the hot water outlet for reducing the temperature of water delivered by the water heater below that at which water is stored in the water storage vessel, wherein the cold water flow path is located within the water storage vessel.

The water heater may be suitable for a variety of installations, such as commercial, industrial or domestic installations. The capacity of the vessel may vary according to the application, with capacities as small as 100 liters for small domestic or office appliances and 1,000 or more for large commercial or industrial installations. The water heater may include electrical heating elements or may include gas or other fuel burners in the conventional manner.

The vessel may be a cylindrical vessel and may be vertically or horizontally oriented where it has a generally elongate configuration. Preferably, to minimise its footprint for the purpose of space and to minimise structural requirements in the vessels walls, the vessel will generally, be installed with its axis upright.

In a water heater according to a preferred embodiment, the cold water inlet includes an inlet pipe extending into the water storage vessel and through which water to be heated is admitted to the vessel, and the cold water flow path includes a connecting pipe communicating with and extending from the cold water inlet pipe inside the water storage vessel to the hot water outlet.

Preferably also the hot water outlet includes an outlet pipe extending into the water storage vessel and through which heated water is drawn from the water storage vessel, and the connecting pipe joins with the outlet pipe at a point within the water storage vessel so that heated water drawn from the vessel through the outlet pipe is mixed with lower temperature water passing through the connecting pipe. The diameter of the connecting pipe may be selected to mix water flowing therethrough in a predetermined desired proportion with heated water drawn from the water storage vessel.

In a preferred embodiment, the connecting pipe of the cold water flow path communicates with the cold water inlet pipe closely adjacent to the location where the inlet pipe enters the water storage vessel, and extends in a substantially straight line along the inside of the wall of the water storage vessel to join with the outlet pipe closely adjacent to the location where the outlet pipe extends through and passes from the water storage vessel towards the top region thereof.

In an alternative possible embodiment, the cold water flow path is located substantially centrally within the water storage vessel.

The cold water inlet may include a single inlet port extending through a wall of the vessel. Preferably, the cold water inlet port is located in a side wall of the vessel in line with current accessibility and installation requirements, although a workable arrangement could still include a cold water inlet port located in the floor or top of the vessel. Preferably, the cold water inlet port is located at a lower portion of the vessel where the heating elements or burners are typically located and where the coldest water stored in the vessel is generally found. The cold water inlet may include more than one inlet port to give alternatives during installation. For example, the cold water inlet may include a pair of diametrically opposed inlet ports (or at other circumferential locations) in the wall or walls of the vessel, the more convenient one of which (for access and connection) is used to connect with external incoming cold water supply fittings. Any unused inlet port(s) may remain sealed in the conventional manner with suitable stop fittings. A single cold water flow path to the hot water outlet may be shared in common by the two cold water inlets. Alternatively each of the two cold water inlets may have a respective associated cold water flow path from the cold water inlet to the hot water outlet.

Similarly, the hot water outlet may include one or more outlet ports to provide an installer with alternatives for connecting the water outlet to a tempered or hot water delivery line. The outlet port may be usefully located in any wall of the vessel, such as a side wall or the top of the vessel. In one embodiment, the outlet port may be located in a upper side wall of the vessel so that its location is near where hot water is drawn off typically near the top of the vessel and to the side of the vessel to accommodate standard installation/space constraints. The hot water take-off point is therefore most advantageously located in the upper region of the vessel, although arrangements in which the location of the hot water take-off point is lower in the vessel are considered to be within the scope of this invention.

The connecting pipe may have any configuration to convey cold water from the cold water inlet to the hot water outlet. The connecting pipe is preferably located near to the side wall of the vessel so that the volume of water in the cold water flow path is minimised. During quiescent periods when no water is being drawn from the water heater, this volume of water in the flow path will be heated by conduction of heat from the stored water in the vessel so that, upon first opening of the outlet, the mixing of this heated water with water passing through the outlet will result no significant spike, or at most in only a transient spike, in water temperature above the desired outlet temperature before cold water flow through the cold water flow path tempers the water outlet temperature to the desired level.

If the possibility of a short duration or even a significant duration temperature spike above the desired outlet water temperature is not a significant issue, the connecting pipe may be located centrally within the vessel. For example, the pipe may be substantially coaxially aligned with the vessel. In both embodiments, the tempering line is preferably linear and extends in a direct line the cold water inlet pipe in the lower portion of the vessel to the outlet pipe located in the upper portion of the vessel.

A diffuser is preferably provided at the cold water entry point within the vessel, the diffuser being located in proximity to the bottom of the water storage vessel and being arranged to introduce cold water from the connected cold water inlet into the vessel with minimum turbulence created in the body of water within the vessel.

In a further possible embodiment the water heater may have a single hot water outlet located generally centrally in a top wall of the water storage vessel. Associated with the hot water outlet there is preferably a hot water take off passage within the water storage vessel and through which hot water is drawn from a top region of the water storage vessel and arranged to pass hot water to turbulently mix with cold water passing through the cold water flow path. Preferably, the hot water take off passage extends at an acute angle to an outlet pipe constituting the hot water outlet passing through the top of the vessel, the cold water flow path meeting at the acute angle so that hot water being drawn from the vessel passes around the acute angle simultaneously mixing with the cold water from the cold water flow path.

The fittings or junctions connecting the inlet, outlet and connecting pipe are advantageously located within the vessel. Such an arrangement is effective to reduce the likelihood and/or adverse consequences of leakages or breakages because the junctions are immersed within the stored water within the vessel. Where such a leakage or failure results in failure to deliver an adequate proportion of cold water through the connecting pipes to cool the hot water being drawn from the vessel, the consequence will be the delivery of water hotter than expected to a user at a tap fitting. Whilst the delivery of such hot water to a user is undesirable, it should also alert the user to the need to repair or replace the heater or fittings to address the leakage problem.

BRIEF DESCRIPTION OF THE DRAWINGS

Possible and preferred features of the present invention will now be described with particular reference to the accompanying drawings. However it is to be understood that the features illustrated in and described with reference to the drawings are not to be construed as limiting on the scope of the invention. In the drawings:

Referring to FIG. 1, there is shown the components of a water heater relevant to the present invention, including a water vessel or tank 10 comprising a cylindrical wall 11, a domed bottom 12 and a domed top end 13. Integrated with an inlet and an outlet system 20 is a tempering system 30.

Figure 1:
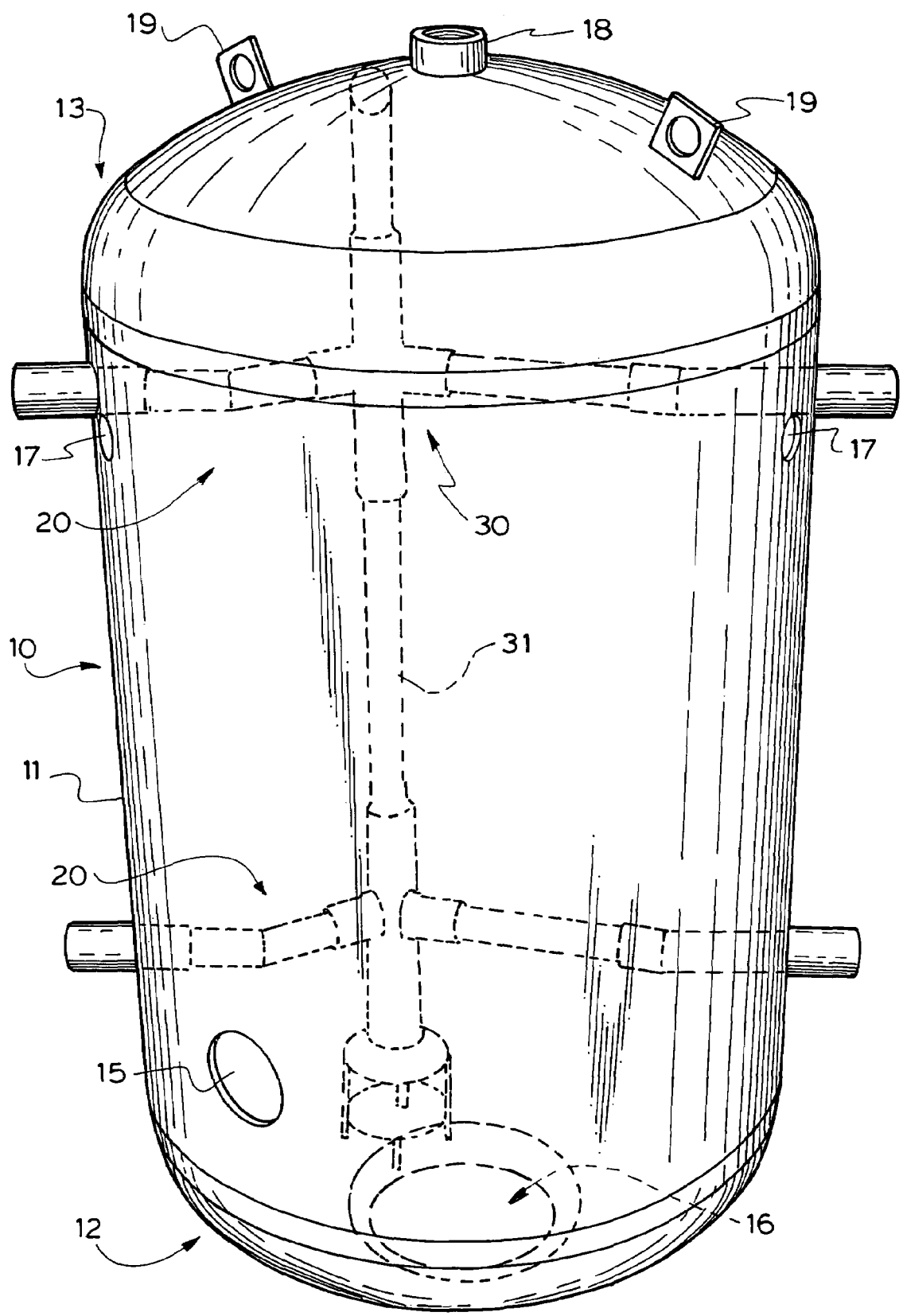
FIG. 1 is a perspective view of a hot water vessel according to one possible embodiment.

The tank 10 includes a heater element port 15 for mounting an electrical heater element unit internally in the tank 10 at its lower end in conventional manner. The tank 10 further includes a bottom end maintenance port 16 for providing access to the internal components during and post manufacture. In the upper region of the cylindrical wall 11 a small aperture 17 is provided for sealably mounting an internal temperature sensor. A similar aperture may be provided on the opposed wall surface of the cylindrical wall 11 In standard manner, the tank 10 is further provided with a pressure release vent 18 at the peak of the dome 13 and securing brackets 19 welded on the upper surface of the domed top 13 to facilitate mounting the tank unit during installation.

Figure 2:
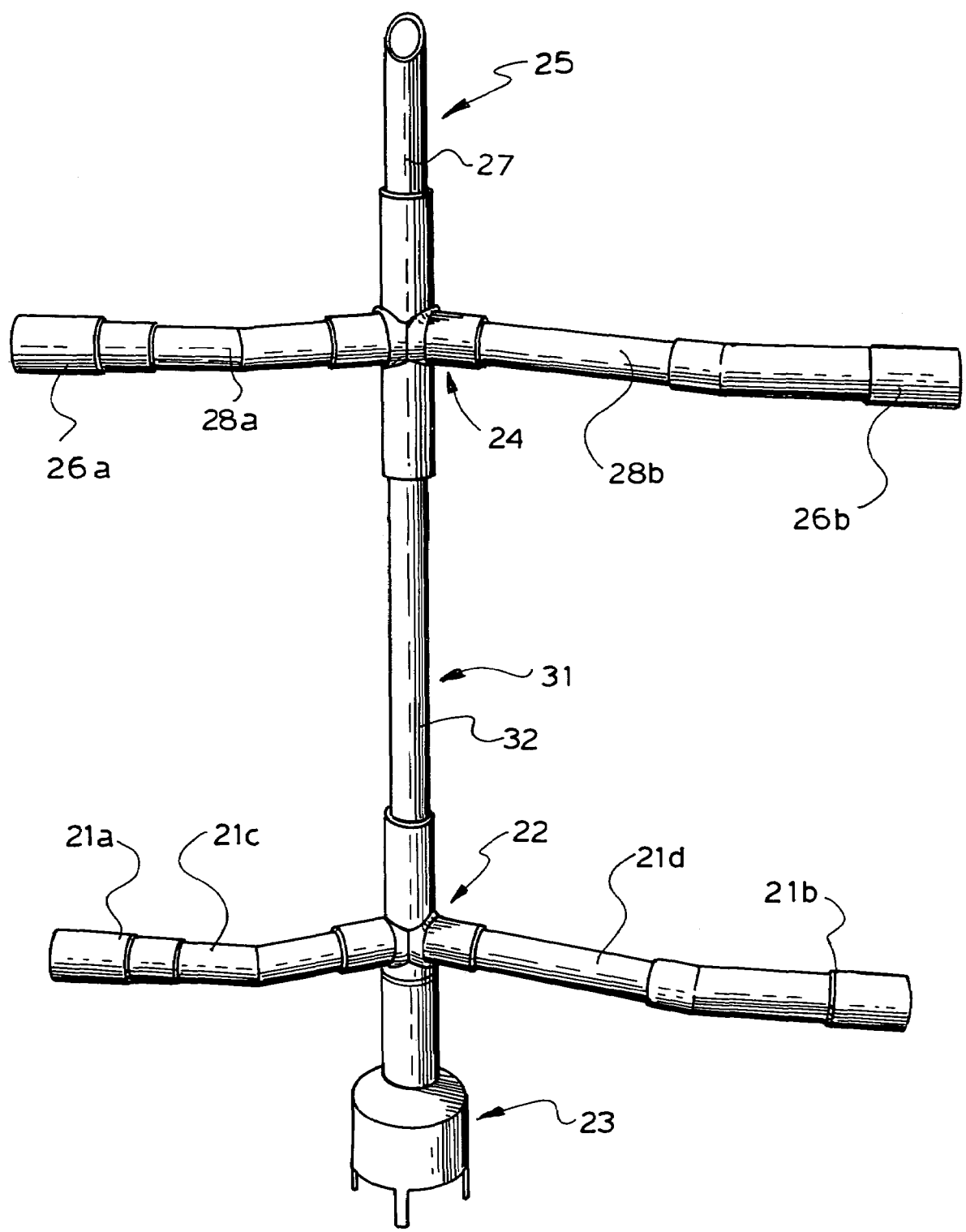
FIG. 2 is a perspective view of the tempering unit according to the embodiment shown in FIG. 1.
Figure 3:
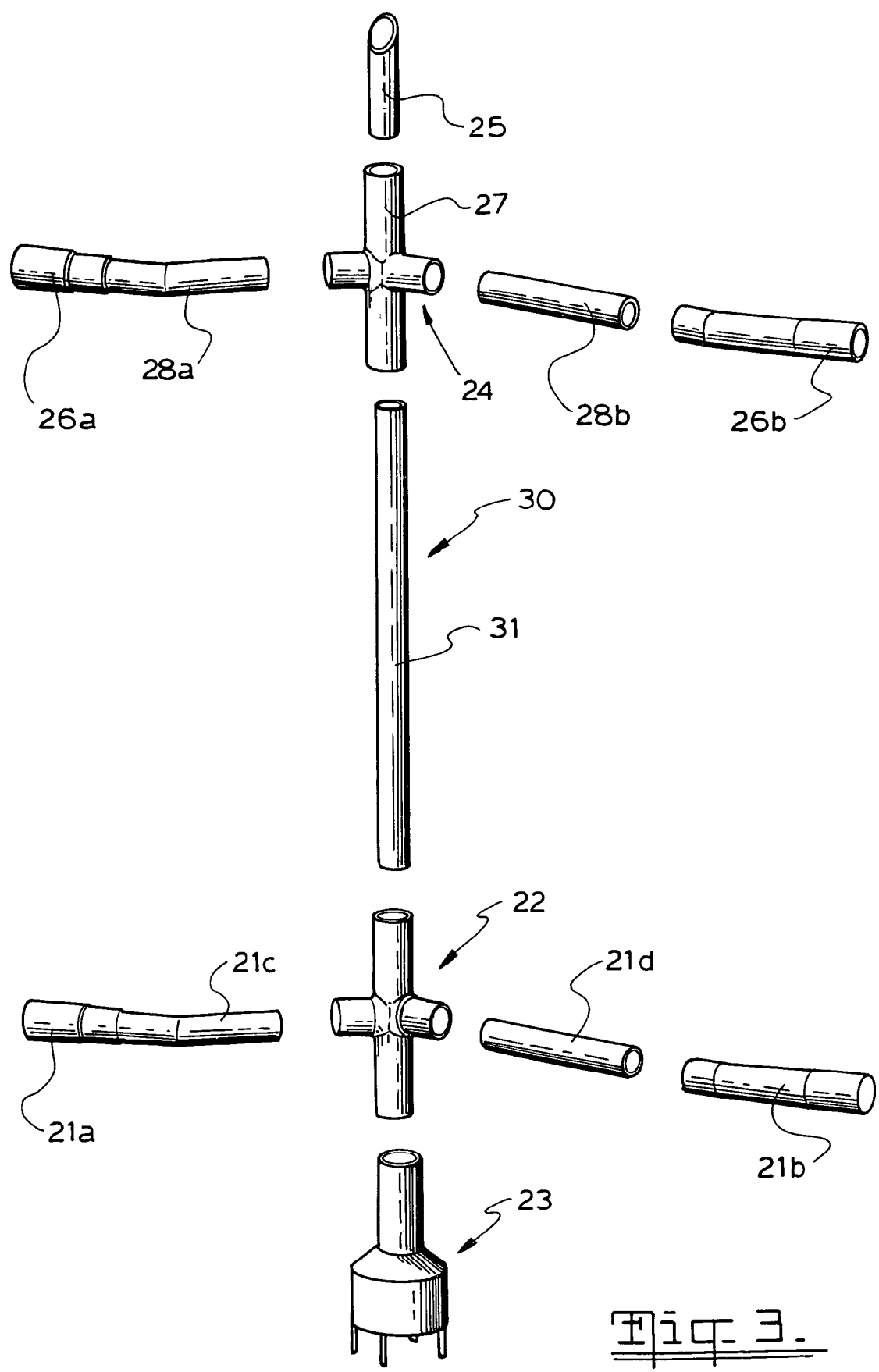
FIG. 3 is an exploded view of the tempering unit shown in FIG. 2.

The internal piping/tempering unit 20, 30 is most clearly seen in FIGS. 2 and 3. The internal piping unit 20, 30 includes alternative or dual cold water inlets 21a, 21b. One or other of the cold water inlets 21a, 21b is in use connected to a cold water supply line and the other of the cold water inlets 21a, 21b may be sealed by a stop (not shown).

The cold water inlets 21a, 21b extend through inlet pipes 21c, 21d within the tank 10 and join at a cold water junction 22. Extending downwardly from the cold water junction 22 is a cold water diffuser 23 for diffusing incoming cold water into the water in the base of the tank 10. Extending upwardly from the cold water junction 22 is a tempering tube or pipe 31 that extends to the upper region of the tank 10 to a hot water junction 24. The tempering tube 31 has a narrow internal bore 32 to limit and thereby control the volume of cold water drawn up the tempering tube 31 from the cold water junction 22. Extending upwardly from the hot water junction 24 is a hot water take-off pipe 25 having an inclined aperture to draw hot water from the uppermost region of the tank 10 in domed top 13. Also extending horizontally and in opposed directions from the hot water junction 24 are outlet pipes 28a, 28b leading to a pair of hot water outlets 26a, 26b. The pair of opposed water outlets 26a, 26b may be used to supply different outgoing hot water delivery lines or one of the tempered water outlets 26a, 26b may be sealed so that only the other water outlet 26b or 26a is used.

It can be seen that the internal diameter of the bore 27 in the hot water take-off pipe 25 is significantly larger than the diameter of the tempering tube bore 31, whereby the tempering system 30 is adapted to draw off a specific ratio of hot water to cold water typically comprising a higher proportion of hot water than cold water. The derived proportions and hence the diameters of the bores 27 and 25 can be empirically determined.

Figure 4:
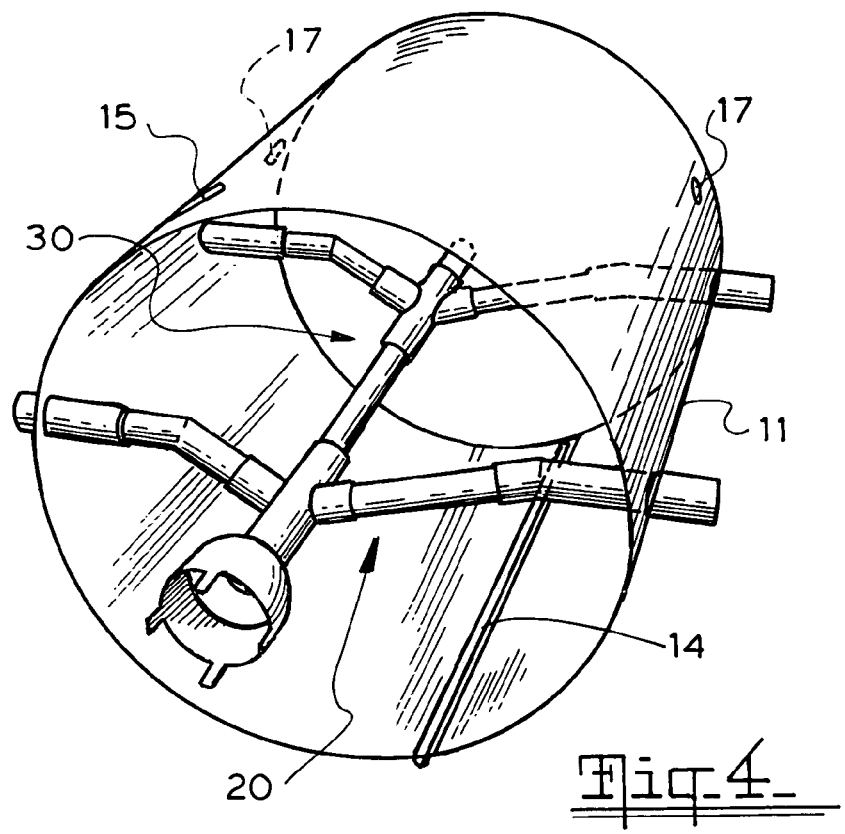
FIG. 4 is a perspective bottom end view of a cylindrical vessel and tempering unit of a water heater during manufacture.
Figure 5:
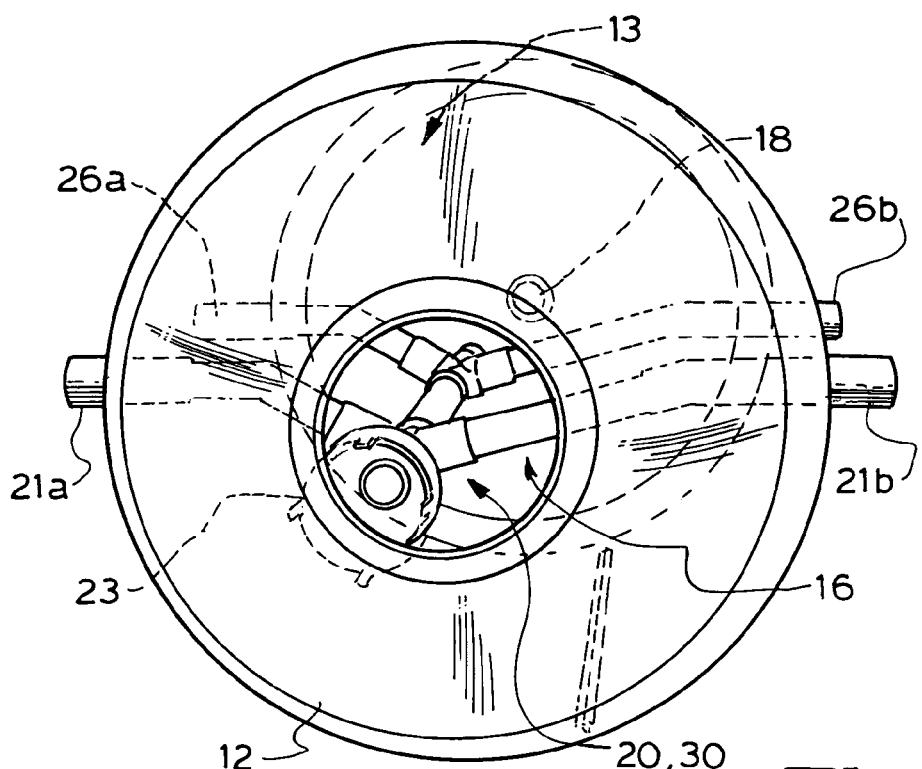
FIG. 5 is a perspective end view of an assembled water heater vessel made according to the embodiment of FIG. 1.

As shown in FIG. 4, the tank 10 may be manufactured by first forming a cylindrical wall 11 by rolling sheet metal, such as stainless steel to form the cylinder and welding a sealed seam 14 to join the respective ends of the sheet. The various apertures 15, 17 and ports for inlets 21a, 21b and for outlets 26a, 26b are formed by suitable metal working tools or by automated, robotic machinery at this stage. The internal piping 20, 30 is then installed in the internal space defined by the cylindrical wall 11. The domed top 13 and domed bottom 12 are sealingly welded to the respective ends of the cylindrical wall 11 either manually or by an automated robotic process, the latter step of internally welding the domed bottom 12 being achieved by accessing the weld zones through the access opening 16. The access opening 16 may be reversibly sealed and bolted using a suitable non-perishable gasket to achieve a removable water tight seal and the potential for access should maintenance or repairs be required. The tank 10 is located within a casing and surrounded by insulation (not shown).

In use, the installed tank 10 is connected to a cold water supply by cold water inlet 21a or 21b. One or both of the hot water outlets 26a, 26b are connected to outgoing hot water delivery lines terminating at closable valve means such as at taps (not shown). When a hot water tap is opened, tempered water (typically about 50° C. on leaving the hot water outlet 26, 26b) flows through the respective tempered water outlet pipe 28a or 28b, thereby inducing flow of stored hot water (typically about 65°-75° C.) through the hot water take-off tube 25 and drawing a lesser proportion of cold water up the tempering tube 30 due to the relatively narrower bore 31 to be mixed at the hot water junction 24. The resultant tempered water flows from the hot water junction 24 through the tempered water outlet 26a, 26b, leading to the opened hot water tap.

Figure 6:
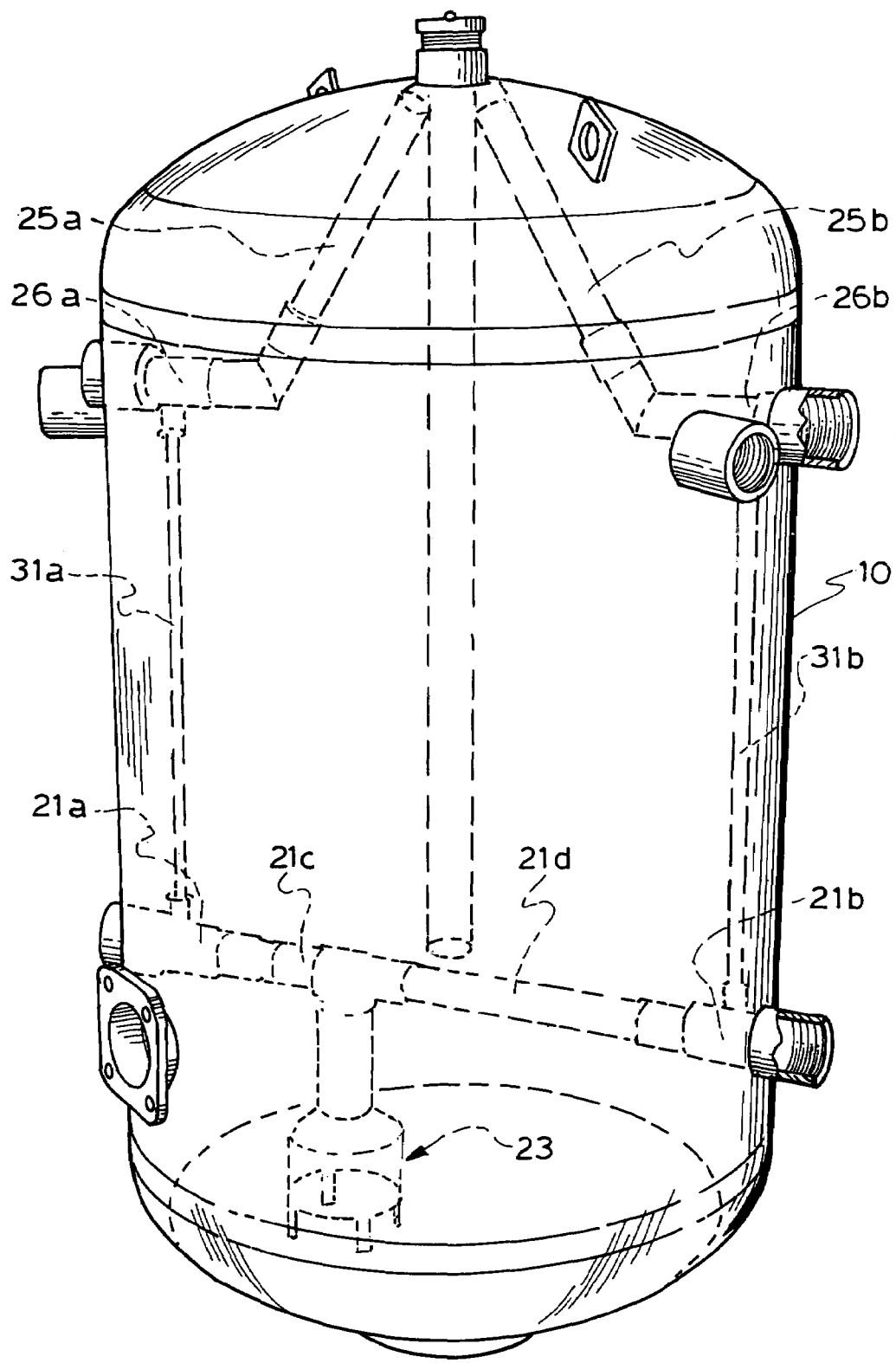
FIG. 6 is a perspective view of an alternative construction of a hot water vessel according to the present invention.

In FIG. 6, the components corresponding to those illustrated in the embodiment of FIGS. 1 to 5 use the same reference numerals. In this embodiment of FIG. 6, there are two cold water inlets 21a, 21b which communicate through pipes 21c, 21d with diffuser 23 in the bottom of the tank 10. However, instead of a tempering tube or pipe 31 extending up through the center of the vessel, the embodiment of FIG. 6 has two connecting pipes 31a, 31b which respectively are connected to the cold water inlets 21a, 21b, closely adjacent to the locations where the inlet pipes 21a, 21b enter the water storage vessel 10. The connecting tempering pipes 31a, 31b extend upwardly in direct lines along the inside of the wall of the vessel 10 and join with the respective outlet pipes 26a, 26b closely adjacent to the locations where the outlet pipes 26a, 26b pass outwardly through the wall of the vessel 10. The outlets 26a, 26b draw hot water through pipes 25a, 25b from close to the top of the vessel.

Compared to the embodiment of FIGS. 1 to 5, in the embodiment of FIG. 6 during quiescent conditions when water is not being drawn from the heater there is a lesser volume of water in the flow path comprising the short extent of inlet 21a and/or 21c, the tempering line 31a, 31b and the short length of outlet 26a, 26b. This volume of water in the cold water bypass flow path will be heated by conduction of heat from the stored water in the vessel 10. When a tap or the like downstream of the outlet 26a or 26b is first opened and hot water commences to be drawn from the tank 10, there is only a relatively small volume of hot water in the cold water bypass flow path 21a, 31a, 26a (or 21b, 31b, 26b) which will mix with the hot water being drawn through the outlet 26a or 26b from the line 25a (or 25b). The mixing with the hot water drawn off of this heated water initially at rest in the cold water flow path will result in a small but not significant spike, or at most a transient spike, in the water temperature immediately downstream of the outlet 26a (or 26b), possibly above the desired water outlet temperature. However, cold water will immediately thereafter be flowing through the cold water flow path 21a, 31a, 26a (or 21b, 31b, 26b) which tempers the temperature of the water passing through the outlet.

Figure 7:
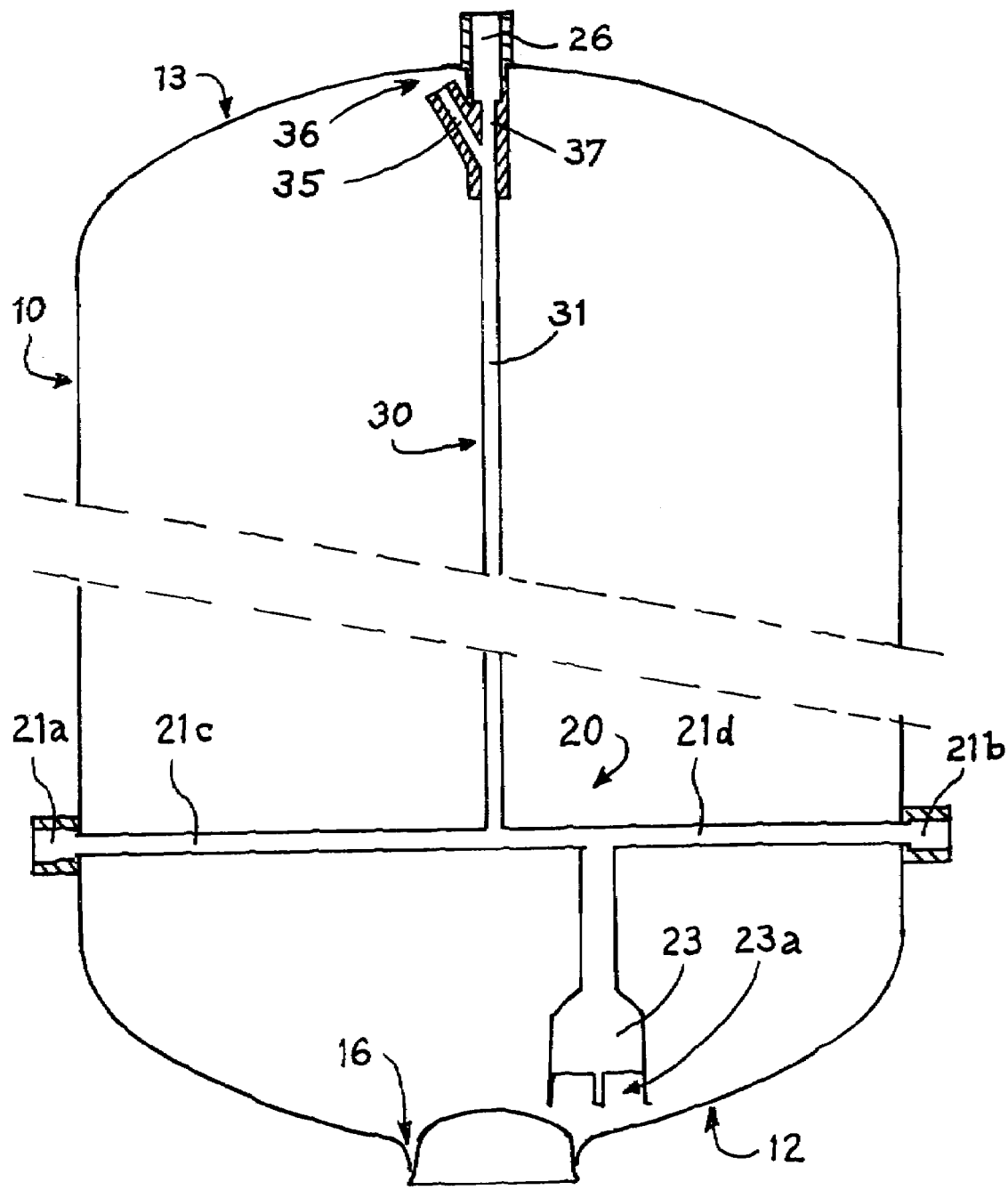
FIG. 7 is a schematic side sectional view of another alternative embodiment of water heater embodying the invention.

The water heater in FIG. 7 has two cold water inlets 21a, 21b located at respective different circumferential locations, both the cold water inlets communicating with a cold water entry point 23a within the vessel 10 where cold water from either inlet enters the vessel. Thus the water heater can be installed so that a cold water source can be connected to whichever of the two cold water inlets 21a, 21b is more conveniently located for access and connection and the other cold water inlet is closed.

As in the earlier embodiments a diffuser 23 is provided at the cold water entry point 23a within the vessel 10, the diffuser being located in proximity to the bottom 12 of the water storage vessel and being arranged to introduce cold water from the connected cold water inlet 21a, 21b into the vessel 10 with minimum turbulence created in the body of water within the vessel. A single cold water flow path 30 extends to the hot water outlet 26 shared in common by the two cold water inlets 21a, 21b.

The water heater in FIG. 7 has a single hot water outlet 26 located generally centrally in the top wall 13 of the water storage vessel 10. Associated with the hot water outlet 26 is a hot water take off passage 35 within the water storage vessel 10 and through which hot water is drawn from a top region 36 of the water storage vessel and arranged to pass hot water to turbulently mix with cold water passing through the cold water flow line 31. The hot water take off passage 35 extends at an acute angle to an outlet pipe 37 leading to or constituting the hot water outlet 26 passing through the top 13 of the vessel 10 and the cold water flow line 31 meets at the acute angle so that hot water being drawn from the vessel through passage 35 passes around the acute angle simultaneously mixing with the cold water from the cold water flow line 31. The fitting comprising the take off passage 35 and outlet pipe 37 may be made of a plastics material.

Orientation terms used in the specification and claims such as vertical, horizontal, top, bottom, upper and lower are to be interpreted as relational and are based on the premise that the component, item, article, apparatus, device or instrument will usually be considered in a particular orientation, typically with the hot water outlet uppermost.

It will be seen that the preferred embodiment of the water heater described with reference to the drawings can be more compact compared to a heater with an externally located tempering pipe extending from the cold water inlet to the hot water outlet. Also if there is a leakage or pipe breakage in any part of the tempering flow path, there is no external spillage and consequent damage where the heater is installed and used. Quality control can also be improved since the tempering system is factory manufactured and fitted compared to an externally plumbed tempering line.

The invention claimed is:

1. A water heater for delivering heated water and having a water storage vessel in which heated water is stored and the vessel having a top region from which water is drawn, the heater having:
   (a) a cold water inlet for admitting water to be heated into the vessel, the cold water inlet including an inlet pipe extending into the water storage vessel and through which water to be heated is admitted into the vessel;
   (b) a hot water outlet through which heated water drawn from the vessel is delivered, the hot water outlet including an outlet pipe extending into the water storage vessel; the heater further having a hot water take off providing a flow path for hot water drawn from the top region within the vessel and leading to the outlet pipe;
   (c) a cold water flow path extending from the cold water inlet to the hot water outlet for reducing the temperature of water delivered by the water heater through the hot water outlet below that at which water is stored in the water storage vessel and at which water is drawn through the hot water take off, the cold water flow path including a connecting pipe within the vessel communicating with and extending from the cold water inlet pipe inside the vessel to the hot water outlet pipe, the hot water outlet pipe including a hot water junction located within the vessel at which the hot water take off from the top region of the vessel joins with the connecting pipe so that heated water drawn from the top region of the vessel through the hot water take off is mixed with lower temperature water entering the hot water junction from the connecting pipe and the resulting mixture flows from the hot water junction through the hot water outlet pipe so as to be delivered through the hot water outlet of the heater, wherein the connecting pipe of the cold water flow path joins with the cold water inlet pipe closely adjacent to the location where the inlet pipe enters the water storage vessel, and extends in a direct line along the inside of a wall of the water storage vessel to join with the hot water junction closely adjacent to the location where the outlet pipe extends through and passes from the water storage vessel.

2. A water heater as claimed in claim 1 wherein the outlet pipe passes through the wall of the water storage vessel towards the top region thereof whereby the connecting pipe of the cold water flow path extends in a substantially straight line along the inside of the wall from the inlet pipe to the hot water outlet.

3. A water heater for delivering heated water and having a water storage vessel in which heated water is stored and the vessel having a bottom to which water is supplied and a top region from which water is drawn, the heater having:
   (a) a cold water inlet for admitting water to be heated into the vessel, the cold water inlet including an inlet pipe extending into the water storage vessel and through which water to be heated is admitted into the vessel;
   (b) a hot water outlet through which heated water drawn from the vessel is delivered, the hot water outlet including an outlet pipe extending into the water storage vessel; the heater further having a hot water take off providing a flow path for hot water drawn from the top region within the vessel and leading to the outlet pipe;
   (c) a cold water flow path extending from the cold water inlet to the hot water outlet for reducing the temperature of water delivered by the water heater through the hot water outlet below that at which water is stored in the water storage vessel and at which water is drawn through the hot water take off, the cold water flow path including a connecting pipe within the vessel communicating with and extending from the cold water inlet pipe inside the vessel to the hot water outlet pipe, the hot water outlet pipe including a hot water junction located within the vessel at which the hot water take off from the top region of the vessel joins with the connecting pipe so that heated water drawn from the top region of the vessel through the hot water take off is mixed with lower temperature water entering the hot water junction from the connecting pipe and the resulting mixture flows from the hot water junction through the hot water outlet pipe so as to be delivered through the hot water outlet of the heater, wherein there are two cold water inlets located at respective different circumferential locations, both the cold water inlets communicating with the bottom of the vessel where cold water from either inlet enters the vessel, whereby the water heater can be installed so that a cold water source can be connected to whichever of the two cold water inlets is more conveniently located for access and connection and the other cold water inlet is closed.

4. A water heater as claimed in claim 3 wherein a diffuser is provided within the vessel, the diffuser being located in proximity to the bottom of the water storage vessel and being arranged to introduce cold water from the connected cold water inlet into the vessel with minimum turbulence created in the body of water within the vessel.

5. A water heater as claimed in claim 3 wherein there is a single cold water flow path to the hot water outlet shared in common by the two cold water inlets.

6. A water heater as claimed in claim 3 wherein there are two hot water outlets, each having a respective said hot water junction, and wherein each of the two cold water inlets has a respective associated cold water flow path from the cold water inlet to a respective said hot water junction and its respective associated hot water outlet.

7. A water heater for delivering heated water and having a water storage vessel in which heated water is stored and the vessel having a top wall and a top region immediately under the top wall from which water is drawn, the heater having:
   (a) a cold water inlet for admitting water to be heated into the vessel, the cold water inlet including an inlet pipe extending into the water storage vessel and through which water to be heated is admitted into the vessel;
   (b) a hot water outlet through which heated water drawn from the vessel is delivered, the hot water outlet including an outlet pipe extending through the top wall of the vessel and into the water storage vessel; the heater further having a hot water take off providing a flow path for hot water drawn from the top region within the vessel and leading to the outlet pipe;
   (c) a cold water flow path extending from the cold water inlet to the hot water outlet for reducing the temperature of water delivered by the water heater through the hot water outlet below that at which water is stored in the water storage vessel and at which water is drawn through the hot water take off, the cold water flow path including a connecting pipe within the vessel communicating with and extending from the cold water inlet pipe inside the vessel to the hot water outlet pipe, the hot water outlet pipe including a hot water junction located within the vessel at which the hot water take off from the top region of the vessel joins with the connecting pipe so that heated water drawn from the top region of the vessel through the hot water take off is mixed with lower temperature water entering the hot water junction from the connecting pipe and the resulting mixture flows from the hot water junction through the hot water outlet pipe so as to be delivered through the hot water outlet of the heater, wherein the hot water take off comprises a passage within the water storage vessel and through which hot water is drawn from the top region of the water storage vessel and the passage is arranged to pass hot water into the hot water junction so as to turbulently mix with cold water entering the junction from the cold water flow path.

8. A water heater as claimed in claim 7 wherein the hot water take off passage extends at an acute angle to the outlet pipe leading to the hot water outlet passing through the top wall of the vessel, the cold water flow path meeting at the acute angle so that hot water being drawn from the vessel passes around the acute angle simultaneously mixing with the cold water from the cold water flow path.

9. A water heater for delivering heated water and having a water storage vessel in which heated water is stored and the vessel having a top region from which water is drawn, the heater having:

(a) a cold water inlet for admitting water to be heated into the vessel, the cold water inlet including an inlet pipe extending into the water storage vessel and through which water to be heated is admitted into the vessel;

(b) a hot water outlet through which heated water drawn from the vessel is delivered, the hot water outlet including an outlet pipe extending into the water storage vessel; the heater further having a hot water take off providing a flow path for hot water drawn from the top region within the vessel and leading to the outlet pipe;

(c) a cold water flow path extending from the cold water inlet to the hot water outlet for reducing the temperature of water delivered by the water heater through the hot water outlet below that at which water is stored in the water storage vessel and at which water is drawn through the hot water take off, the cold water flow path including a connecting pipe within the vessel communicating with and extending from the cold water inlet pipe inside the vessel to the hot water outlet pipe, the hot water outlet pipe including a hot water junction located within the vessel at which the hot water take off from the top region of the vessel joins with the connecting pipe so that heated water drawn from the top region of the vessel through the hot water take off is mixed with lower temperature water entering the hot water junction from the connecting pipe and the resulting mixture flows from the hot water junction through the hot water outlet pipe so as to be delivered through the hot water outlet of the heater.

* * * * *